US010489250B2

(12) United States Patent
Inbaraj et al.

(10) Patent No.: US 10,489,250 B2
(45) Date of Patent: Nov. 26, 2019

(54) BACKUP VALIDATION OF VIRTUAL DESKTOP INFRASTRUCTURE SYSTEM

(71) Applicant: AMZETTA TECHNOLOGIES, LLC, Norcross, GA (US)

(72) Inventors: Joseprabu Inbaraj, Suwanee, GA (US); Muthukkumaran Ramalingam, Duluth, GA (US); Divya Nettem, Suwanee, GA (US)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 209 days.

(21) Appl. No.: 15/478,932

(22) Filed: Apr. 4, 2017

(65) Prior Publication Data

US 2018/0285200 A1 Oct. 4, 2018

(51) Int. Cl.
G06F 11/14 (2006.01)
G06F 9/455 (2018.01)
G06F 9/451 (2018.01)
G06F 16/188 (2019.01)

(52) U.S. Cl.
CPC .......... *G06F 11/1458* (2013.01); *G06F 9/452* (2018.02); *G06F 9/45558* (2013.01); *G06F 16/188* (2019.01); G06F 2009/45587 (2013.01); G06F 2009/45591 (2013.01); G06F 2201/815 (2013.01)

(58) Field of Classification Search
CPC .... G06F 11/1458; G06F 9/452; G06F 16/188; G06F 9/45558; G06F 2009/45591; G06F 2201/815; G06F 2009/45587

USPC .......................................................... 707/654
See application file for complete search history.

(56) References Cited

U.S. PATENT DOCUMENTS

| 9,002,798 B1* | 4/2015 | Raj ...................... G06F 16/128 707/654 |
| 2007/0195703 A1* | 8/2007 | Boyajian ............. G06F 19/3418 370/241 |
| 2008/0046483 A1* | 2/2008 | Lehr ................... G06F 11/1451 |
| 2011/0010515 A1* | 1/2011 | Ranade ............... G06F 11/1451 711/162 |
| 2014/0019613 A1* | 1/2014 | Ishikawa ................. G06F 11/20 709/224 |
| 2014/0215461 A1* | 7/2014 | Laor ................... G06F 9/45533 718/1 |
| 2015/0019495 A1* | 1/2015 | Siden .................. G06F 11/1448 707/649 |
| 2016/0124665 A1* | 5/2016 | Jain ........................ G06F 16/13 711/162 |
| 2017/0168903 A1* | 6/2017 | Dornemann ........ G06F 9/45558 |
| 2017/0177867 A1* | 6/2017 | Crofton ................. G06F 16/113 |

* cited by examiner

*Primary Examiner* — Cam Y T Truong
(74) *Attorney, Agent, or Firm* — Locke Lord LLP; Tim Tingkang Xia, Esq.

(57) ABSTRACT

In an aspect of the disclosure, a method, a computer-readable medium, and a backup system are provided. The backup system obtains a first backup image of a first virtual desktop image of a VDI system. The backup system initiates a first validation of the first backup image against one or more constraints of the first backup image. The backup system initiates an alert procedure when the first validation has failed.

14 Claims, 5 Drawing Sheets

BACKUP VALIDATION OF VIRTUAL DESKTOP INFRASTRUCTURE SYSTEM

BACKGROUND

Field

The present disclosure relates generally to computer systems, and more particularly, to techniques of validating backups of virtual desktop images of a virtual desktop infrastructure (VDI) system.

Background

The statements in this section merely provide background information related to the present disclosure and may not constitute prior art.

Computer virtualization is a technique that involves abstracting a physical computing machine platform into a virtual machine (VM) that is executed under the control of virtualization software running on a single hardware computing platform (also referred to herein as a "host system" or a "host computer"). A group of hardware computing platforms may be organized as a cluster to provide the hardware resources for virtual machines. In a server or data center that employs virtual machines, it is common to see hundreds, even thousands, of virtual machines running on multiple clusters of host systems.

For ease of deployment, software management, and hardware cost reduction reasons, virtual machines have been used to support virtual desktops for use in an organization in place of physical workstations. In a VDI system, system backup is a critical task. Servers and virtual desktops of the VDI system may be backed up periodically. However, the backup images may be corrupted. Therefore, there is a need for a mechanism that can validate the backup images.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a backup system are provided. The backup system obtains a first backup image of a first virtual desktop image of a VDI system. The backup system initiates a first validation of the first backup image against one or more constraints of the first backup image. The backup system initiates an alert procedure when the first validation has failed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
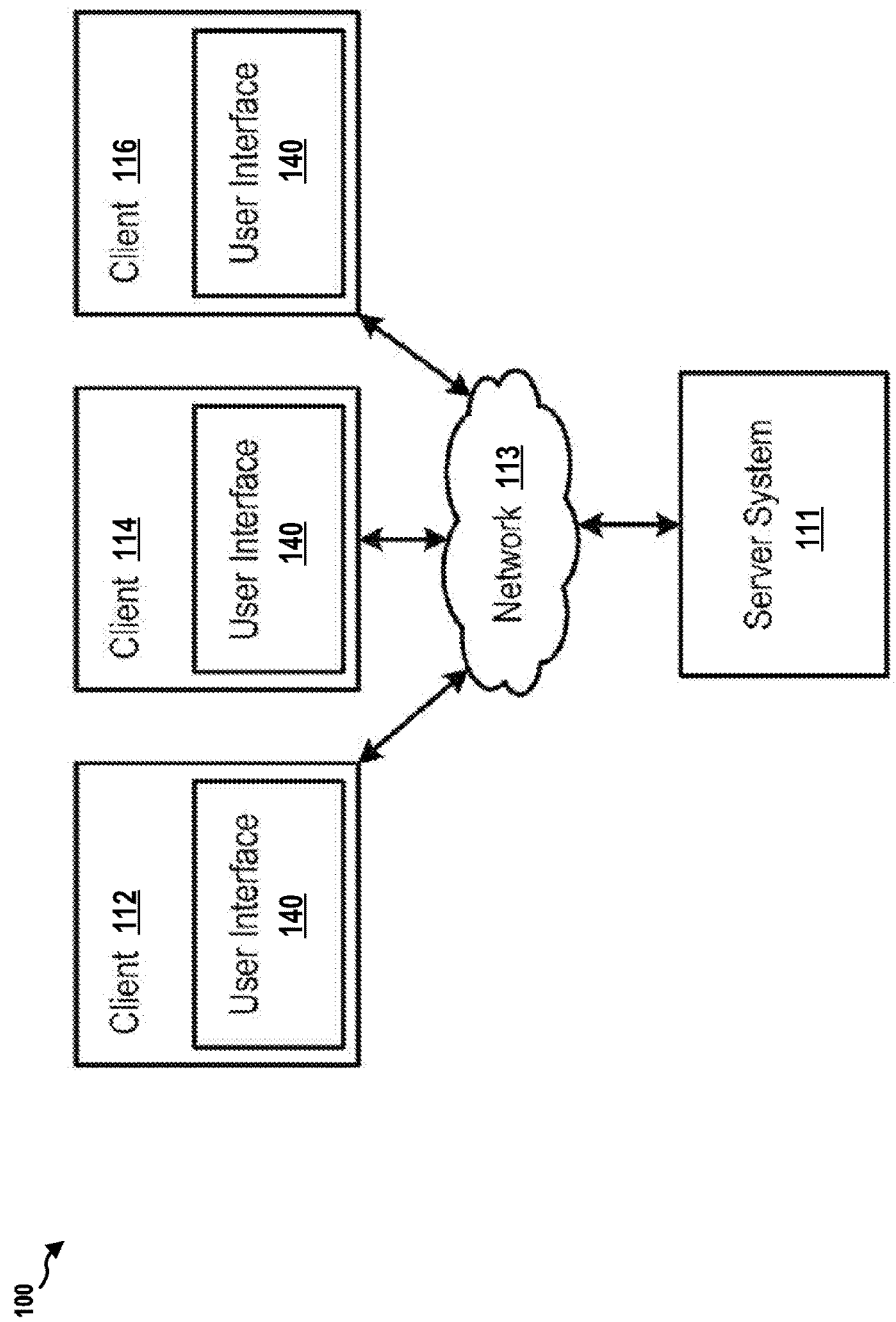
FIG. 1 illustrates a VDI system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates a virtual desktop infrastructure (VDI) system 100. The term, "desktop" refers to a human interface environment through which users can launch, interact with, and manage the user's applications, settings, and data. Traditionally, a desktop is presented by an operating system on a video display, and a user interacts with the desktop using a mouse and keyboard. Applications, documents, and other files may be displayed on the desktop and user input can be received by applications visible to the user on the display. The term "desktop" is also known to be used to refer to a physical computer system or "physical desktop" that might be placed on or near a user's desk, which is distinct from a "laptop" or "handheld," but as used herein, the term "desktop" by itself refers to the human interface environment described above, and not a physical computer system. Using computer virtualization, a user's computer system, including operating system settings, applications and application settings, and data may be transferred or copied as a virtual machine from one physical computer to another. When a virtual machine is copied in this way, the user can access his or her "desktop" from the physical computer system containing the original virtual machine, or the physical computer system containing the copy. The "desktop," therefore, is no longer tied to a particular physical computer system.

The VDI system 100 includes a VDI server system 111 in data communication over a network 113 with several VDI client systems 112, 114, and 116. The network 113 may be any configuration, such as a local area network (LAN), or private or publicly accessible wide area network (WAN), such as the Internet. It should be recognized that FIG. 1 shows a simplified representation of a typical VDI server system 111, which may include other components such as firewalls, connection brokers, and load balancers, as well as back-end storage networks, database servers, among others, as described in greater detail in FIG. 2. Each client system 112, 114, 116 may include a user interface 140 through which a user can interact with his or her desktop.

Figure 2:
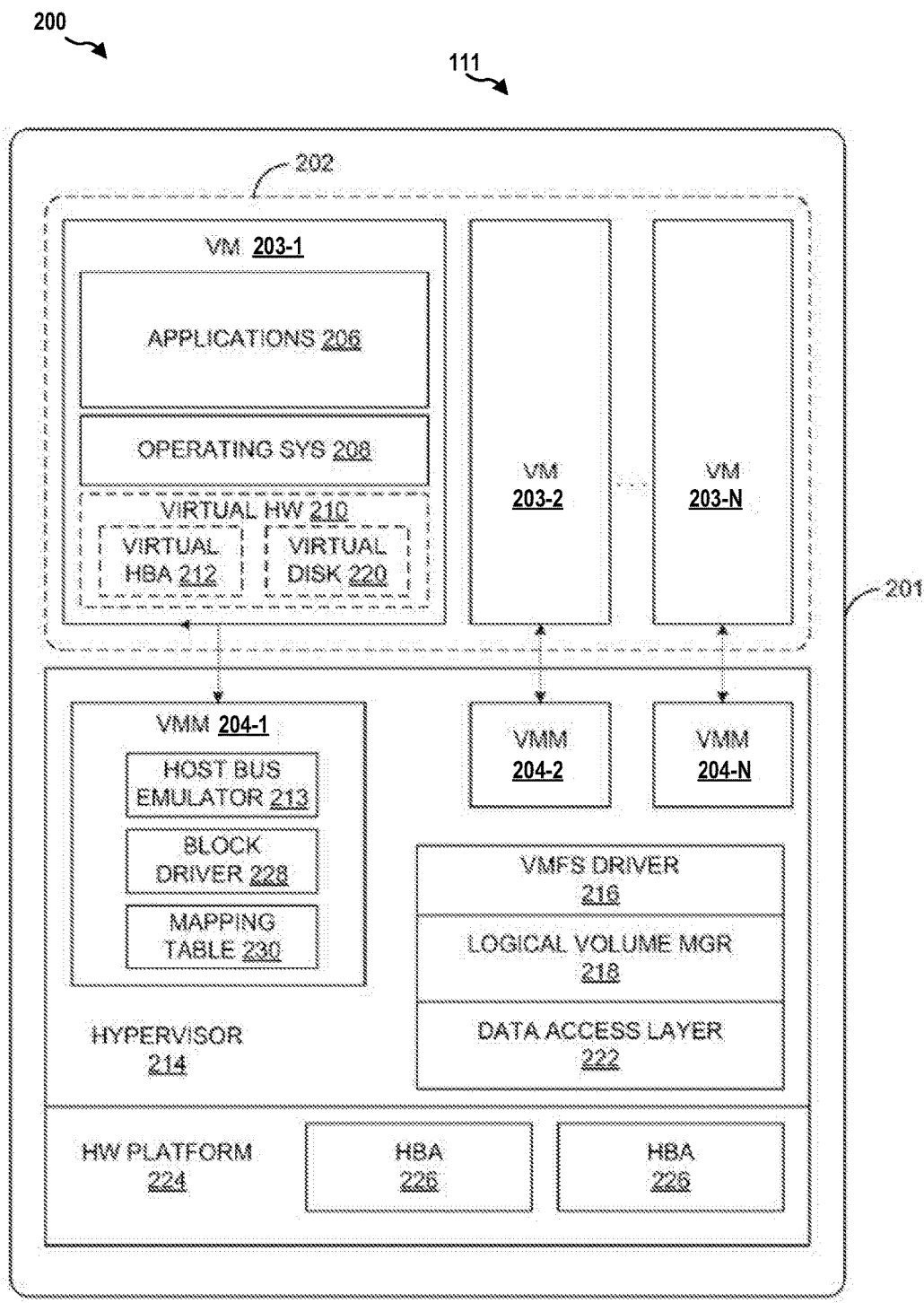
FIG. 2 is diagram illustrating a VM-based system.

FIG. 2 is diagram 200 illustrating the server system 111. The server system 111 includes an integral computer system 201 constructed on a hardware platform 224, including host bus adapters (HBAs) 226 in addition to a processor, memory, and other standard peripheral components (not separately shown). The hardware platform 224 executes a hypervisor 214 supporting a virtual machine execution space 202 within which virtual machines (VMs) 203-1 to 203-N are executed.

The hypervisor 214 provides services and support to enable concurrent execution of VMs 203-1 to 203-N. In turn, each of the VMs 203-1 to 203-N implements a virtual hardware platform 210 as a conceptual layer that supports the execution of a guest operating system 208 and one or more client applications 206 (which may be encapsulated in "application containers," as further discussed below). In certain configurations, the guest operating systems 208 are instances of MICROSOFT® WINDOWS®, LINUX®, etc. Other guest operating systems can be equivalently used. In each instance, a guest operating system 208 includes a native file system layer, typically either an NTFS (New Technology File System) or a ext3 (third extended) file system file system layer. These file system layer interface with the virtual hardware platforms 210 to access, from the perspective of guest operating systems 208, a data storage host bus adapter. In one implementation, virtual hardware platform 210 implements a virtual host bus adapter 212 and a virtual-disk 220 that emulate the necessary system hardware support to enable execution of the guest operating system 208 transparently to the virtualization of the system hardware.

File system calls initiated by guest operating system 208 to perform file system-related data transfer and control operations on virtual-disk 220 are processed and passed through the virtual host bus adapter 212 to adjunct a virtual machine monitor (VMM) 204-1 that implements the virtual system support necessary to coordinate operation with the hypervisor 214. In particular, a host bus emulator 213 functionally in the VMM 204-1 enables the data transfer and control operations to be ultimately passed to the host bus adapters 226. Further, the VMM 204-1 may also include a block driver 228 and accesses a mapping table 230 to assist VMM 204-1 in determining a storage location of data requested by the file system calls from guest operating system 208. For example, upon receiving a file system block level request to read data, the host bus emulator 213 may request the block driver 228 to determine whether the requested file blocks match an entry in mapping table 230. If mapping table 230 includes such an entry, then block driver 228 re-directs the file system block level request to a location specified in the entry of the mapping table 230 rather than allowing the file system block level request to be satisfied by a storage location of virtual-disk 220, itself, as would typically occur. In either case, file system calls for performing data transfer and control operations generated, for example, by applications 206 are translated and passed to a virtual machine file system (VMFS) driver or component 216 that manages access to files (e.g., virtual disks, etc.) stored in data storage systems networked with the server system 111 that may be accessed by any of the VMs 203-1 to 203-N.

For example, a guest operating systems 208 can receive file system calls and perform corresponding command and data transfer operations against virtual disks, such as virtual SCSI (Small Computer System Interface) devices accessible through virtual HBA 212, that are visible to the guest operating systems 208 (e.g., as a virtual-disk 220, etc.). These virtual disks 220 are maintained as files stored on a VMFS, for example, in a storage system networked to the server system 111. Each such virtual-disk 220 may be maintained as a file or set of files stored on a VMFS, for example, in the networked storage system. Guest operating system 208 file system calls are translated from instructions applicable to virtual-disk 220, which is visible to the guest operating system 208, to instructions applicable to a file representing virtual-disk 220 in the networked storage system exposed by a storage system manager to the VMFS. Such translations are performed through a number of component layers of an IO (input/output) stack, beginning at the guest operating system 208 (which receives the file system calls from applications 206), through the virtual HBA 212, the host bus emulator 213, the block driver 228, the VMFS driver 216, a logical volume manager 218, which assists the VMFS driver 216 with mapping files stored in the VMFS with the storage system exposed by the storage system manager, a data access layer 222, including device drivers, and host bus adapters 226 (which, for example, issue a SCSI command to the storage system manager to access storage system).

It should be recognized that the various terms, layers, and categorizations used to describe the virtualization components in FIG. 2 may be referred to differently without departing from their functionality or the spirit or scope of embodiments described herein. For example, while the block driver 228 and the mapping table 230 have been depicted as part of the VMM 204-1, it should be recognized that alternative configurations may implement the block driver 228 as part of a different component of hypervisor 214. Furthermore, while one configuration may implement a mapping table 230 for each corresponding virtual-disk 220, alternative configurations may utilize a global mapping table that includes mappings for all virtual disks. Similarly, it should be recognized that while the VMs 203-1 to 203-N may be considered separate virtualization components between the VMs 203-1 to 203-N and the hypervisor 214 (which, in such a configuration, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative configuration, for example, the conceptual layer described as virtual hardware platform 210 may be merged with and into the VMMs 204-1 to 204-N such that the virtual host bus adapter 212 may be removed from FIG. 2, as its functionality is effectuated by the host bus adapter emulator 213.

At the hypervisor level, the block driver 228 monitors for block read requests that fall into the mapping table 230. If a block read request falls into one of the mappings in the mapping table 230, the hypervisor 214 redirects the block read request to an external data storage/source that stores the requested data and then passes the data back to the file system implementation requesting the data.

In certain configurations, applications 206 that are to be delivered via the virtual desktop are encapsulated in application containers. An application container is a data structure that captures an application in an OS-neutral format. In one implementation for generating such application containers, a standard operating system is scanned as a reference point. The scanning process scans the registry and the file system and generates a list of all the components that are present. Then, the application that is being captured into the application container is installed onto the standard operating system. The installation adds one or more files and makes one or more registry changes to the system. Once the application is completely installed, a post-installation scan of the system is performed and a second list is generated that includes the new additions to the system caused by the installation. Differences in the files and registry changes (and any other changes) between the pre-installation scan list and the post-installation scan list are determined. The resulting files (including an executable of the actual application itself) and registry entries are then stored in an "application container" that may further contain a runtime component and that is itself stored, for example, within a virtual disk of a user's virtual desktop, and that serves as the executable file for the application.

When the user launches the application container (e.g., from the file system of the guest OS of the virtual desktop), the runtime component of the application container executes the code of the application itself (which is embedded in the application container, as previously discussed) and intercepts and redirects any requests by the application code to access registry values and/or files back into the application container itself, to the extent such registry values and/or files were stored in application container, as previously discussed. Because applications captured in such OS-neutral application containers are self-contained, they can be updated (e.g., replaced with a new version of the application, etc.) in a virtual desktop image without interfering with other components of the virtual desktop, enabling such application containers in the virtual desktop to be updated more efficiently, as described in greater detail herein.

In certain configurations, the applications 206 are do not utilize application containers and are actually installed and copied to the file system of the guest OS of the virtual desktop run in the VM 203-1.

The respective virtual desktop run in each of the VMs 203-1 to 203-N includes an OS (operating system), which can be stored in an "OS store," and one or more applications, which can be stored in an "application store," for example, to be accessed by virtual desktops in the form of application containers.

In one configuration, the OS store and/or the application store are locations in networked storage accessible by the server system 111 that respectively store a number of OS images or application containers that can be selected by an administrator or other user when generating a virtual desktop (e.g., sometimes also referred to as a blob (binary large object) store).

In one example, the virtual desktop of the VM 203-1 may include metadata for use by the file system of virtual desktop (e.g., file descriptors of application containers accessible by the file system of the guest OS, etc.) that, for example, provide data block addresses of virtual-disk 220 that purportedly store the application data.

Further, the VMM 204-1 may include a mapping table 230 for the virtual desktop for use by the hypervisor 214 that maps the data block addresses that purportedly contain the application data in virtual-disk 220 to the actual location of data blocks of the application data of a networked storage system.

Figure 3:
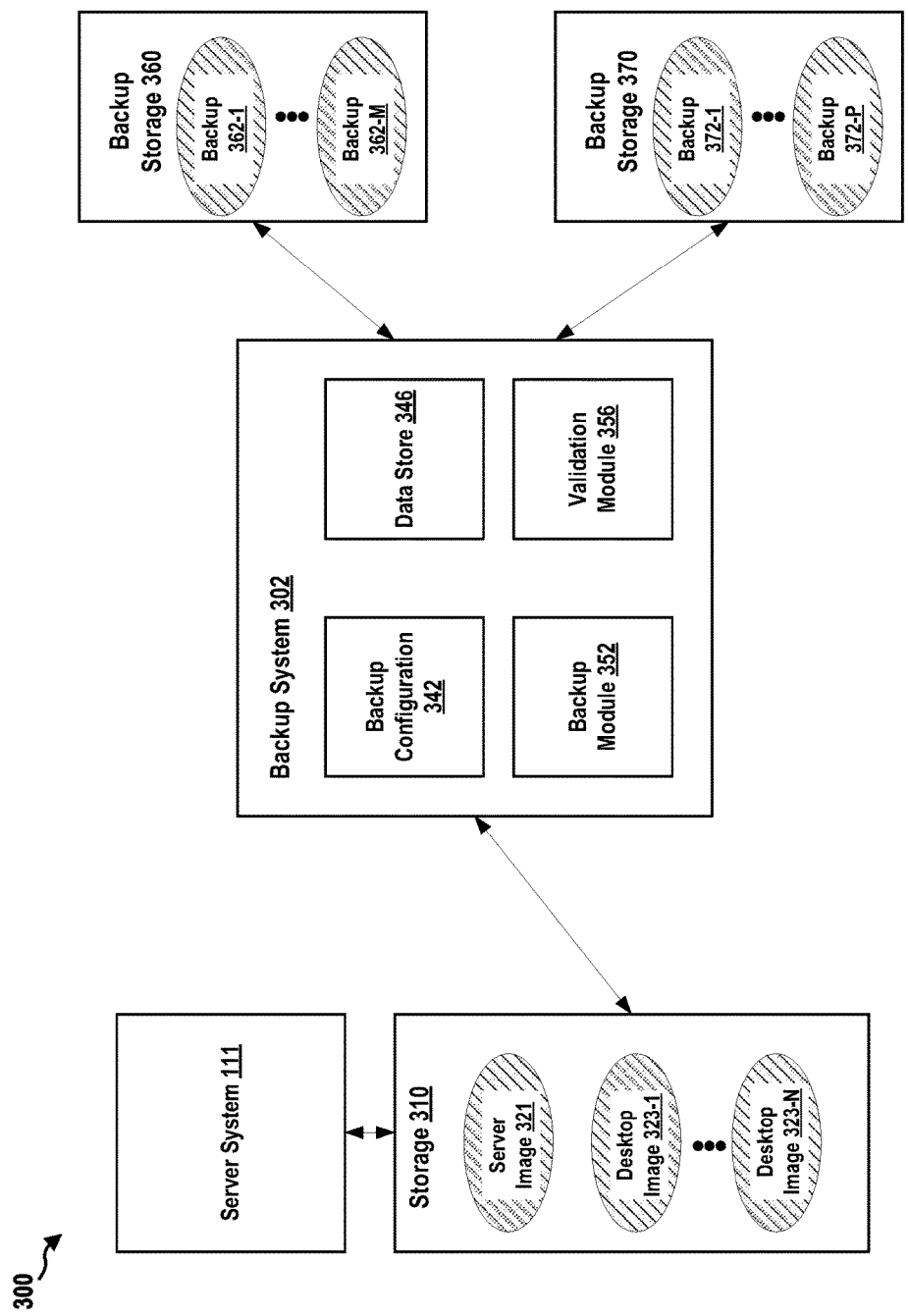
FIG. 3 is diagram illustrating a backup system for the VDI system.

FIG. 3 is diagram 300 illustrating a backup system for the VDI system 100. In this example, the VDI system 100 includes, among other components, the server system 111 as well as a storage 310. The storage 310 stores a server image 321 and desktop images 323-1 to 323-N. When the server system 111 is powered up or initialized, the hardware platform 224 retrieves the server image 321 from the storage 310 and executes the server image 321 to run the hypervisor 214. As described supra, the hypervisor 214 provides the VMs 203-1 to 203-N. The hypervisor 214 may also make the desktop images 323-1 to 323-N available to the VMs 203-1 to 203-N through the respective virtual disks 220 of the VMs 203-1 to 203-N. The VMs 203-1 to 203-N may be configured to execute the respective desktop images 323-1 to 323-N in order to run the respective virtual desktops in the VMs 203-1 to 203-N.

Each of the desktop images 323-1 to 323-N includes code and data for the guest OS 208 and the applications 206 as well as user data/files. Further, the desktop images 323-1 to 323-N may change over time as, for example, the users may customize the guest OS 208, add/remove applications 206, and add/remove user data/files while using the virtual desktops. Similarly, the server image 321 may change over time as the configuration of the hypervisor 214 may change. In certain configurations, the server image 321 and desktop images 323-1 to 323-N stored in the storage 310 can be backed up in one or more media locations as backup images by a backup system 302 in accordance with a set of rules. Further, the backup images may be in an International Organization for Standardization (ISO) 9660 format, a Virtual Hard Disk (VHD) format, or a Hyper-V virtual hard disk (VHDX) format.

In this example, the backup system 302 is configured to back up the server image 321 and desktop images 323-1 to 323-N. The backup system 302 includes, among other components, a backup configuration component 342, a data store 346, a backup component 352, and a validation component 356.

The backup configuration component 342 manages all attributes required for backup and validation. For example, the attributes may include: backup frequency or schedule, validation thresholds, checksums, backup location, the number of backups to be maintained, type of backup, etc. The backup configuration component 342 stores those attributes in the data store 346.

As one example, the backup component 352 may communicate with the backup configuration component 342 to inquire about, among other attributes, the backup schedule, the back location, and the number of backups to be maintained, and the type of backup for the desktop image 323-1. The backup configuration component 342 may retrieve those attributes from the data store 346 and respond the backup component 352 with them. In this example, the backup component 352 determines that the desktop image 323-1 should be backed up weekly, that M, which is an integer greater than 0 (e.g., 5), backups should be stored at a backup storage device 360, and that the type of backup is recursive.

As such, the backup component 352 retrieves the desktop image 323-1 from the storage 310 weekly and backs up the desktop image 323-1 at the backup storage device 360 as backup images 362-1 to 362-M, where the backup image 362-1 may be the most recent backup image. The backup storage device 360 may have one or more storage media such as hard disks. Further, as the backup is a recursive type, during each backup process, the backup component 352 retrieves from the storage 310 and backs up the desktop image 323-1 as well as any data that are referenced by the desktop image 323-1.

In addition, the backup component 352 receives a checksum of the desktop image 323-1 from the storage 310. A checksum is a small-sized datum derived from a block of digital data for the purpose of detecting errors which may have been introduced during its transmission or storage. In certain configurations, the storage 310 may use the desktop image 323-1 as input of a particular checksum function/algorithm (e.g., Fletcher's checksum, Adler-32, and cyclic redundancy checks (CRCs)) to generate the checksum. The backup component 352 may use the received checksum to verify the integrity of the retrieved image. In particular, the backup component 352 may generate a checksum based on the retrieved desktop image 323-1 using the same checksum function/algorithm as the storage 310. The backup component 352 then determines whether the generated checksum matches the received checksum. If they match, the backup component 352 stores the desktop image 323-1 in the backup storage device 360 as the backup image 362-1. The backup component 352 may send the checksum to the backup configuration component 342 with an indication that the checksum is associated with the desktop image 323-1.

Similarly, the backup component 352 may back up the server image 321. In particular, the backup component 352 may communicate with the backup configuration component 342 to inquire about the backup schedule, the back location, and the number of backups to be maintained, and the type of backup for the server image 321. The backup configuration component 342 may retrieve those attributes from the data store 346 and respond the backup component 352 with them. In this example, the backup component 352 determines that the server image 321 should be backed up daily, that P, which is an integer greater than 0 (e.g., 10), backups should be stored at a backup storage device 370, and that the backup process is non-recursive.

As such, the backup component 352 retrieves the server image 321 from the storage 310 daily and backs up the server image 321 at the backup storage device 370 as backup images 372-1 to 372-P, where the backup image 372-1 may be the most recent backup image. Further, the backup component 352 may receive the checksum for each backup image and send the checksum to the backup configuration component 342 for storage in association with that backup image.

The validation component 356 may validate the backup images stored at all backup locations. In a first technique, the validation component 356 can validate a backup image based on certain constraints. In one example, the backup configuration component 342 can determine or obtain constraints to be used to validate each backup image. Those constraints may be stored in the data store 346. The validation component 356 can use this technique to validate both the server image 321 and the desktop images 323-1 to 323-N.

In one example, the validation component 356 communicates with the backup configuration component 342 to inquire about the constraints for validating the backup images of the desktop image 323-1. The constraints for each backup image may include an age threshold and a checksum. In particular, with respect to the backup image 362-M, the constraints include an age threshold that is 5 weeks and the checksum that was previously stored in the data store 346 and associated with the backup image 362-M. The validation component 356 checks whether the backup image 362-M was copied to the backup storage device 360 more than 5 weeks ago. If the backup image 362-M was copied to the backup storage device 360 more than 5 weeks ago, the validation component 356 may determine that the backup image 362-M has failed the validation. Accordingly, the validation component 356 may initiate an alert procedure such as notifying an administrator about the failure through a message. If the backup image 362-M was copied to the backup storage device 360 no more than 5 weeks ago, the validation component 356 may continue to validate the backup image 362-M based on checksum. The validation component 356 may calculate the checksum of the backup image 362-M as described supra and then compare the calculated checksum with the checksum obtained from the backup configuration component 342. If the two checksums do not match, the validation component 356 may determine that the backup image 362-M has failed the validation. Accordingly, the validation component 356 may initiate an alert procedure such as notifying an administrator about the failure through a message. If the two checksums match, the validation component 356 may determine that the backup image 362-M has passed the validation.

In another example, the validation component 356 may communicate with the backup configuration component 342 to inquire about the backup schedule of the server image 321. In this example, the backup configuration component 342 replies to the validation component 356 that the backup schedule is daily. Then the validation component 356 may validate the backup images 372-1 to 372-P to determine if those backup images comply with the back schedule. For example, when the validation component 356 determines that the timestamps specifying the backup time of two consecutive backup images of the backup images 372-1 to 372-P have a time gap that is more than 48 hours, the validation component 356 may determine that the backup images 372-1 to 372-P has failed the validation. Then the validation component 356 may initiate an alert procedure such as notifying an administrator about the failure through a message.

In a second technique, the validation component 356 may validate backup images of the desktop images 323-1 to 323-N by deployment. For example, with respect to the backup image 362-1, the validation component 356 may read meta data or other data included in the backup image 362-1 to determine the configurations and specifications of the VM executing the desktop image 323-1 (e.g., regarding the CPU cores and speed, memory size and speed, and hard disk capacity) as well as the identity of the server/hypervisor that runs the VM. In this example, the validation component 356 obtains the specification/configurations of the VM 203-1 and the identity of the hypervisor 214 from the metadata of the backup image 362-1. Subsequently, the validation component 356 may instruct the hypervisor 214 (or another capable hypervisor) to create a mock VM based on the specification/configurations of the VM 203-1 and then try to deploy and execute the backup image 362-1 on the mock VM. For example, the mock VM and the VM 203-1 may have identical or very similar specification/configurations (e.g., 80% of the specifications/configurations of the two VMs are the same). If the mock VM is not able to execute the backup image 362-1 to deploy the virtual desktop, the validation component 356 can determine that the backup image 362-1 has failed the validation. Accordingly, the validation component 356 may invoke an alert procedure such as notifying an administrator about the failure through a message.

Figure 4:
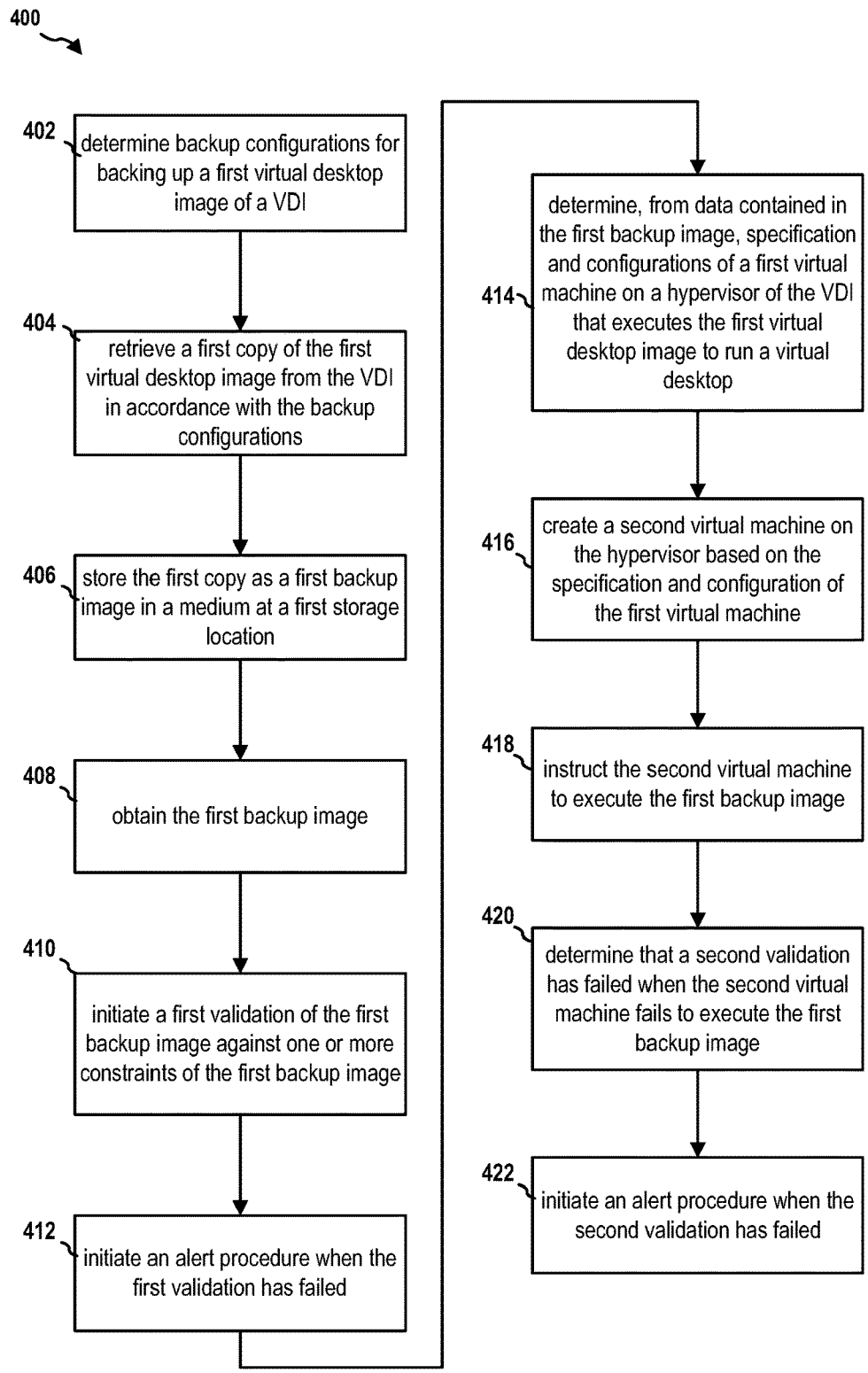
FIG. 4 is a flow chart of a method (process) for backing up a virtual desktop image and validating a backup image.

FIG. 4 is a flow chart 400 of a method (process) for backing up a virtual desktop image and validating a backup image. The method may be performed by a backup system (e.g., the backup system 302 and the apparatus 302'). In certain configurations, at operation 402, the backup system (e.g., at the backup configuration component 342) determines backup configurations for backing up a first virtual desktop image (e.g., the desktop image 323-1) of a VDI system (e.g., the VDI system 100).

In certain configurations, the backup configurations include a backup schedule and a backup location. The backup system retrieves a plurality of respective copies of the first virtual desktop image from the VDI system at a plurality of time points in accordance with the backup schedule. The backup system stores the plurality of respective copies at the backup location as a plurality of backup images (e.g., the backup images 362-1 to 362-M or the backup images 372-1 to 372-P). The first backup image is obtained from the plurality of backup images.

In certain configurations, at operation 404, the backup system retrieves a first copy of the first virtual desktop image from the VDI system in accordance with the backup configurations. Further, the backup system may receive a first checksum of the first copy from the VDI system. The backup system stores the checksum in a data store (e.g., the data store 346). At operation 406, the backup system stores the first copy as a first backup image (e.g., the backup image 362-1) of the first virtual desktop image in a medium at a first storage location (e.g., the backup storage device 360).

At operation 408, the backup system obtains the first backup image. At operation 410, the backup system initiates a first validation of the first backup image against one or more constraints of the first backup image. At operation 412, the backup system initiates an alert procedure when the first validation has failed.

In certain configurations, the one or more constraints includes a first checksum of the first backup image. In the first validation, the backup system calculates a second checksum of the first backup image. The backup system matches the first checksum with the second checksum. The backup system determines that the first validation has failed when the first checksum does not match the second checksum.

In certain configurations, the one or more constraints includes an age threshold of the first backup image. In the first validation, the backup system determines an age of the first backup image. The backup system determines that the first validation has failed when the age of the first backup image is older than the age threshold.

In certain configurations, the first backup image is obtained from a plurality of backup images of the first virtual desktop image. The constraints include a time gap threshold. The backup system determines a time gap between time points at which two consecutive backup images of the plurality of backup images are stored. The backup system determines that the first validation has failed when the time gap is greater than the time gap threshold.

In certain configurations, at operation 414, the backup system determines, from data contained in the first backup image, specification and configuration of a first virtual machine (e.g., the VM 203-1) on a hypervisor (e.g., the hypervisor 214) of the VDI system that executes the first virtual desktop image to run a virtual desktop. At operation 416, the backup system creates a second virtual machine on the hypervisor based on the specification and configuration of the first virtual machine. At operation 418, the backup system instructs the second virtual machine to execute the first backup image. At operation 420, the backup system determines that a second validation has failed when the second virtual machine fails to execute the first backup image. At operation 422, the backup system initiates an alert procedure when the second validation has failed.

Figure 5:
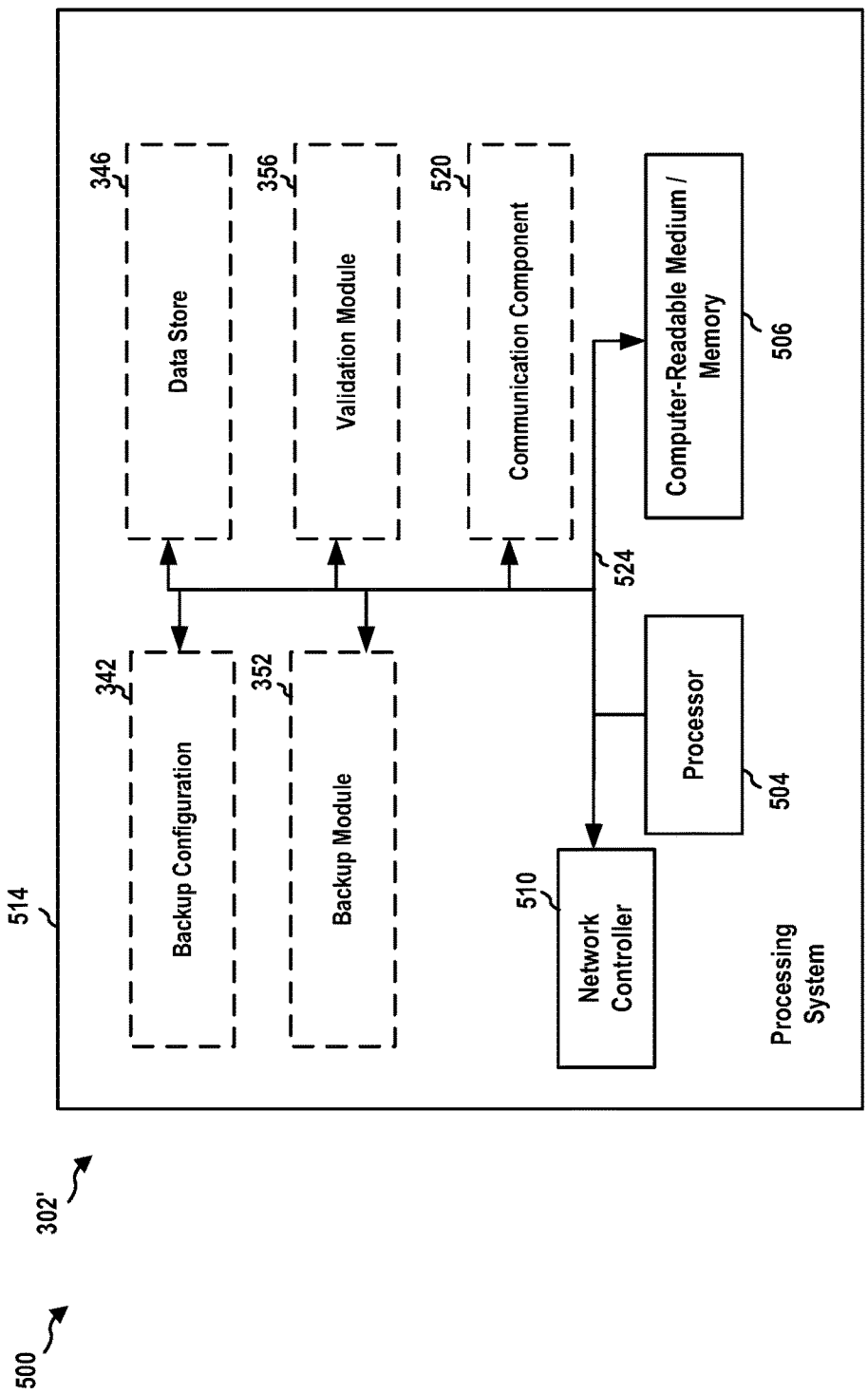
FIG. 5 is a diagram illustrating an example of a hardware implementation for an apparatus employing a processing system.

FIG. 5 is a diagram 500 illustrating an example of a hardware implementation for an apparatus 302' employing a processing system 514. The apparatus 302' may implement the backup system 302. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the computer-readable medium/memory 506, a network controller 510, etc. The bus 524 may also link various other circuits such as timing sources, peripherals, voltage regulators, and power management circuits, which are well known in the art, and therefore, will not be described any further.

The processing system 514 may be coupled to the network controller 510. The network controller 510 provides a means for communicating with various other apparatus over a network. The network controller 510 receives a signal from the network, extracts information from the received signal, and provides the extracted information to the processing system 514, specifically a communication component 520 of the apparatus 302'. In addition, the network controller 510 receives information from the processing system 514, specifically the communication component 520, and based on the received information, generates a signal to be sent to the network. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system further includes at least one of the backup configuration component 342, the data store 346, the backup component 352, the validation component 356. The components may be software components running in the processor 504, resident/stored in the computer readable medium/memory 506, one or more hardware components coupled to the processor 504, or some combination thereof.

The apparatus 302' may be configured to include means for performing operations described supra referring to FIG. 4. The aforementioned means may be one or more of the aforementioned components of the apparatus/system 302 and/or the processing system 514 of the apparatus 302' configured to perform the functions recited by the aforementioned means It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a backup system that comprises a processor, the method comprising:
   determining, by the backup system, backup configurations for backing up a first virtual desktop image of a virtual desktop infrastructure (VDI) system, wherein the backup configurations include a backup schedule and a backup location;
   retrieving, by the backup system, a first copy of the first virtual desktop image from the VDI system in accordance with the backup configurations;
   storing, by the backup system, the first copy as a first backup image in a storage medium at a first storage location;
   obtaining, by the backup system, the first backup image of the first virtual desktop image of the virtual desktop infrastructure (VDI) system;
   initiating, by the backup system, a first validation of the first backup image against one or more constraints of the first backup image, wherein the one or more constraints includes an age threshold of the first backup image, wherein the first validation includes: determining an age of the first backup image, and determining that the first validation has failed when the age of the first backup image is older than the age threshold;
   initiating, by the backup system, an alert procedure when the first validation has failed to notify a failure of the first validation to an administrator;
   determining, by the backup system from data contained in the first backup image, specification and configuration of a first virtual machine on a hypervisor of the VDI system that executes the first virtual desktop image to run a virtual desktop;
   creating, by the backup system, a second virtual machine on the hypervisor based on the specification and configuration of the first virtual machine;
   instructing, by the backup system, the second virtual machine to execute the first backup image;
   determining, by the backup system, that a second validation has failed when the second virtual machine fails to execute the first backup image; and
   initiating, by the backup system, an alert procedure when the second validation has failed to notify a failure of the second validation to the administrator.

2. The method of claim 1, wherein the one or more constraints includes a first checksum of the first backup image, wherein the first validation includes: calculating a second checksum of the first backup image; matching the first checksum with the second checksum; and determining that the first validation has failed when the first checksum does not match the second checksum.

3. The method of claim 1, wherein the first backup image is obtained from a plurality of backup images of the first virtual desktop image, wherein the constraints include a time gap threshold, the method further comprising: determining a time gap between time points at which two consecutive backup images of the plurality of backup images are stored; and determining that the first validation has failed when the time gap is greater than the time gap threshold.

4. The method of claim 1, further comprising: receiving a first checksum of the first copy from the VDI system; and storing the first checksum in a data store.

5. The method of claim 4, retrieving a plurality of respective copies of the first virtual desktop image from the VDI system at a plurality of time points in accordance with the backup schedule; and storing the plurality of respective copies at a backup location as a plurality of backup images, wherein the first backup image is obtained from the plurality of backup images.

6. A backup system, comprising: a memory; and at least one processor that coupled to the memory configured to:
  determine backup configurations for backing up a first virtual desktop image of a virtual desktop infrastructure (VDI) system, wherein the backup configurations include a backup schedule and a backup location;
  retrieve a first copy of the first virtual desktop image from the VDI system in accordance with the backup configurations;
  store the first copy as a first backup image in a storage medium at a first storage location;
  obtain, at a backup system, a first backup image of the first virtual desktop image of the virtual desktop infrastructure (VDI) system;
  initiate, at a backup system, a first validation of the first backup image against one or more constraints of the first backup image, wherein the one or more constraints includes an age threshold of the first backup image, wherein the first validation includes: determining an age of the first backup image; and determining that the first validation has failed when the age of the first backup image is older than the age threshold;
  initiate, at a backup system, an alert procedure when the first validation has failed to notify a failure of the first validation to an administrator;
  determine, from data contained in the first backup image, specification and configuration of a first virtual machine on a hypervisor of the VDI system that executes the first virtual desktop image to run a virtual desktop;
  create, at a backup system, a second virtual machine on the hypervisor based on the specification and configuration of the first virtual machine;
  instruct, at a backup system, the second virtual machine to execute the first backup image;
  determine, at a backup system, that a second validation has failed when the second virtual machine fails to execute the first backup image; and
  initiate an alert procedure when the second validation has failed to notify a failure of the second validation to the administrator.

7. The backup system of claim 6, wherein the one or more constraints includes a first checksum of the first backup image, wherein during the first validation, the at least one processor is further configured to: calculate a second checksum of the first backup image; match the first checksum with the second checksum; and determine that the first validation has failed when the first checksum does not match the second checksum.

8. The backup system of claim 6, wherein the first backup image is obtained from a plurality of backup images of the first virtual desktop image, wherein the constraints include a time gap threshold, wherein the at least one processor is further configured to: determine a time gap between time points at which two consecutive backup images of the plurality of backup images are stored; and determine that the first validation has failed when the time gap is greater than the time gap threshold.

9. The backup system of claim 6, wherein the at least one processor is further configured to: receive a first checksum of the first copy from the VDI system; and store the first checksum in a data store.

10. The backup system of claim 9, retrieve a plurality of respective copies of the first virtual desktop image from the VDI system at a plurality of time points in accordance with the backup schedule; and store the plurality of respective copies at a backup location as a plurality of backup images, wherein the first backup image is obtained from the plurality of backup images.

11. A non-transitory computer-readable medium storing computer executable code for operating a computer-readable medium, comprising code executed by a processor to:
  determine backup configurations for backing up a first virtual desktop image of a virtual desktop infrastructure (VDI) system, wherein the backup configurations include a backup schedule and a backup location;
  retrieve a first copy of the first virtual desktop image from the VDI system in accordance with the backup configurations;
  store the first copy as a first backup image in a storage medium as a first storage location;
  obtain, at a backup system, the first backup image of the first virtual desktop image of the virtual desktop infrastructure (VDI) system;
  initiate, at the backup system, a first validation of the first backup image against one or more constraints of the first backup image, wherein the one or more constraints includes an age threshold of the first backup image, wherein the first validation includes: determining an age of the first backup image; and determining that the first validation has failed when the age of the first backup image is older than the age threshold;
  initiate, at the backup system, an alert procedure when the first validation has failed to notify a failure of the first validation to an administrator;
  determine, from data contained in the first backup image, specification and configuration of a first virtual machine on a hypervisor of the VDI system that executes the first virtual desktop image to run a virtual desktop;
  create, at the backup system, a second virtual machine on the hypervisor based on the specification and configuration of the first virtual machine;
  instruct, at the backup system, the second virtual machine to execute the first backup image;
  determine, at the backup system, that a second validation has failed when the second virtual machine fails to execute the first backup image; and
  initiate an alert procedure when the second validation has failed to notify a failure of the second validation to the administrator.

12. The non-transitory computer-readable medium of claim 11, wherein the one or more constraints includes a first checksum of the first backup image, wherein during the first validation, the code is further configured to: calculate a second checksum of the first backup image; match the first checksum with the second checksum; and determine that the first validation has failed when the first checksum does not match the second checksum.

13. The non-transitory computer-readable medium of claim 11, wherein the first backup image is obtained from a plurality of backup images of the first virtual desktop image, wherein the constraints include a time gap threshold, wherein the code is further configured to: determine a time gap between time points at which two consecutive backup images of the plurality of backup images are stored; and determine that the first validation has failed when the time gap is greater than the time gap threshold.

14. The non-transitory computer-readable medium of claim 11, wherein the code is further configured to: receive a first checksum of the first copy from the VDI system; and store the first checksum in a data store.

* * * * *